(12) United States Patent
Amarasteanu

(10) Patent No.: US 12,383,047 B1
(45) Date of Patent: Aug. 12, 2025

(54) INSULATED BOTTLE FOR LIQUIDS WITH SECONDARY STORAGE COMPARTMENT

(71) Applicant: BB Ecochim Advence Grup SRL, Constanta (RO)

(72) Inventor: Andrei Alexandru Amarasteanu, Bucharest (RO)

(73) Assignee: BB Ecochim Advence Grup SRL, Constanta (RO)

( * ) Notice: Subject to any disclaimer, the term of this patent is extended or adjusted under 35 U.S.C. 154(b) by 307 days.

(21) Appl. No.: 18/307,857

(22) Filed: Apr. 27, 2023

(51) Int. Cl.
*A47J 41/00* (2006.01)
*A45F 3/18* (2006.01)

(52) U.S. Cl.
CPC .............. *A45F 3/18* (2013.01); *A47J 41/0077* (2013.01)

(58) Field of Classification Search
CPC ............ B65D 81/3211; B65D 81/3216; B65D 81/3227; B65D 1/06; B65D 23/00; B65D 23/08; B65D 23/0885; B65D 23/0842; A47J 41/0077
See application file for complete search history.

(56) References Cited

U.S. PATENT DOCUMENTS

| | | | |
|---|---|---|---|
| 4,230,230 A | 10/1980 | Mumford | |
| 5,176,269 A | 1/1993 | Herman | |
| 5,840,185 A * | 11/1998 | Hughes | C02F 1/003 210/477 |
| 6,405,675 B1 | 6/2002 | Mills | |
| 7,070,065 B2 | 7/2006 | Wong | |
| 7,828,139 B2 | 11/2010 | Enghard | |
| 10,959,553 B2 * | 3/2021 | Nichols | B65D 47/122 |
| 11,021,314 B2 * | 6/2021 | Tolman | B65D 81/3869 |
| 2006/0102580 A1 * | 5/2006 | Betras | B65D 23/00 215/370 |
| 2009/0266737 A1 * | 10/2009 | Cole | A47G 19/2288 220/636 |
| 2014/0174965 A1 * | 6/2014 | Herling | A47J 41/0077 206/216 |

(Continued)

FOREIGN PATENT DOCUMENTS

| | | |
|---|---|---|
| CN | 213949309 U | 8/2021 |
| JP | 2000-291433 A | 10/2000 |
| KR | 10-2016-0085180 A | 7/2016 |

OTHER PUBLICATIONS https://www.theteaspot.com/products/cold-brew-tea-sport-bottle; accessed Sep. 21, 2021.

(Continued)

*Primary Examiner* — Don M Anderson
(74) *Attorney, Agent, or Firm* — Rogowski Law LLC

(57) ABSTRACT

A modular insulated bottle for liquids includes an inner cylindrical container to hold a liquid that is surrounded by an external case. In an embodiment, the cylindrical container is glass and the external case is a translucent thermoplastic material. A gasket is removably and sealingly engageable to the top opening of the inner cylindrical container. A shoulder fitting secures over the gasket and is threadedly engaged to the external case. The gasket has a threaded top opening such as a spout that is configured to engage with one or more caps to adapt the bottle for different functions. A footer cap engages with a footer of the external case and creates a secondary storage compartment for items such as snacks, powders and/or pills.

13 Claims, 9 Drawing Sheets

(56) References Cited

U.S. PATENT DOCUMENTS

2020/0115108 A1* 4/2020 Ferrando García .... B65D 85/72
2021/0101708 A1* 4/2021 McElfresh ............... B65D 1/06
2021/0206534 A1* 7/2021 Yu ....................... A47J 41/0077
2022/0250782 A1* 8/2022 Deylamian ............ B65D 41/04

OTHER PUBLICATIONS https://www.columbia.com/c/men-equipment-waterbottles/; accessed Sep. 21, 2021.
https://www.theteaspot.com/products/everest-tea-tumbler-stainless-steel-infuser; accessed Sep. 21, 2021.
https://hydrocellusa.com/collections/accessories; accessed Sep. 21, 2021.
https://hydroflask.com/standard-mouth-accessory-bundle; accessed Sep. 21, 2021.
https://www.kleankanteen.com/collections/hydration/products/plastic-free-water-bottle-27oz; accessed Sep. 21, 2021.

* cited by examiner

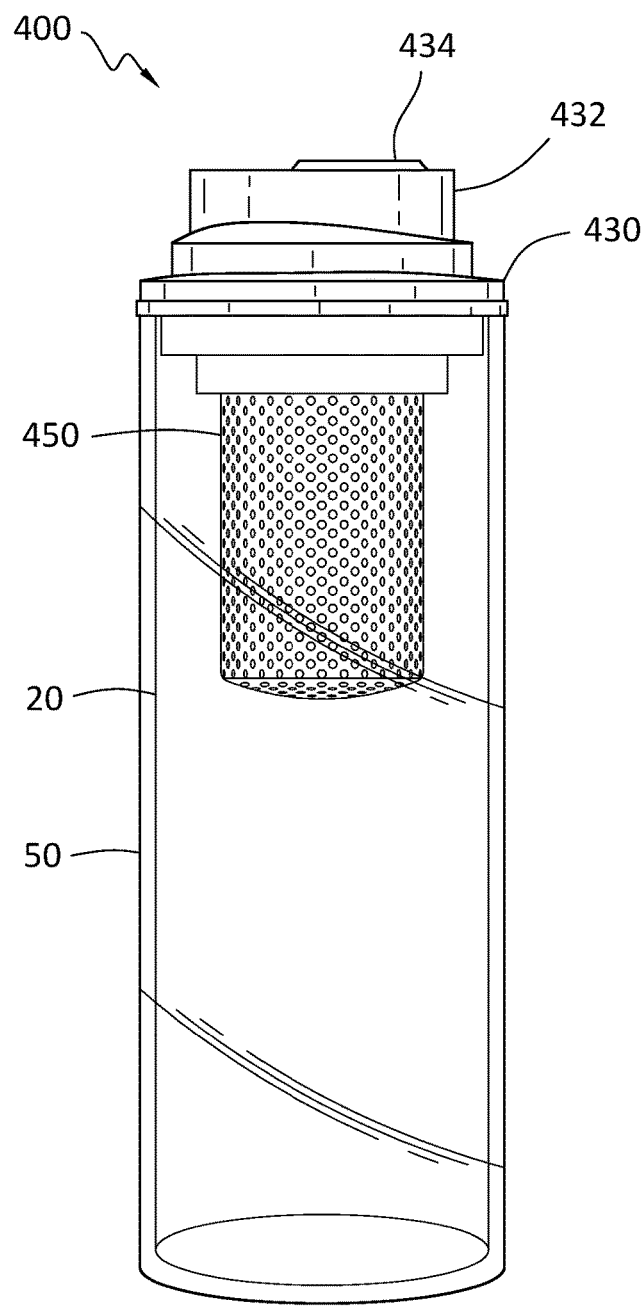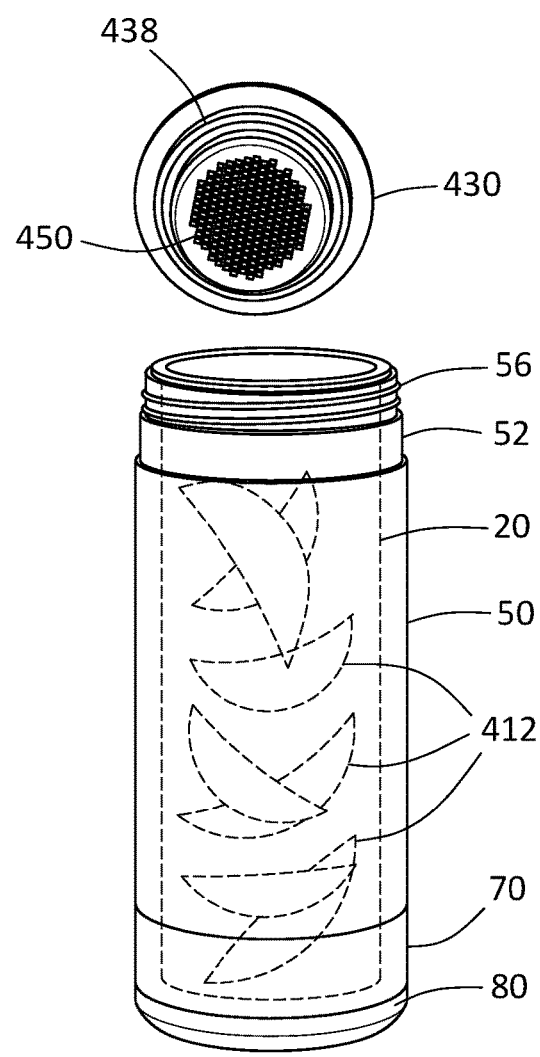
FIG. 18
FIG. 19

_US 12,383,047 B1_

INSULATED BOTTLE FOR LIQUIDS WITH SECONDARY STORAGE COMPARTMENT

FIELD OF THE INVENTION

The present invention is generally directed to drinkware containers or bottles used for liquids, such as beverages, that include a separate compartment to hold non-liquid materials.

BACKGROUND OF THE INVENTION

Drinkware containers or bottles, such as sports bottles and thermoses, may be configured to store liquids. They may be designed to hold hot or cold drinkable liquids, such as water, sports drinks, coffee, tea, sodas, or even alcoholic beverages. The containers may of double-wall vacuumed formed construction so that a desired temperature of the liquid within the container, whether or hot or cold, may be maintained. Such insulated containers may include threaded top caps or other closures. Such insulated containers may be in the form of a bottle with a top neck and spout from which the liquid inside the container may be dispensed.

BRIEF SUMMARY OF THE INVENTION

In a first embodiment of the present invention, a bottle for liquids has a cylindrical container that removably seats within an exterior case. The cylindrical container is configured for receiving a hot or cold liquid, such as water, sports drinks, sodas, teas, coffees and energy drinks. The cylindrical container has a sidewall, a closed bottom and an open top opposite the closed bottom. The cylindrical container may be formed of glass or borosilicate glass or reinforced borosilicate glass, or other suitable material.

A gasket having a lower portion with a sealing surface is removably insertable into the open top of the cylindrical container. The gasket has an upper portion opposite the lower portion. The gasket defines a conduit adapted to receive liquid to be dispensed from the bottle (i.e., from the cylindrical container of the bottle. The gasket has an externally threaded spout projecting from the upper portion, which spout is in fluid communication with the open volume of the cylindrical container. The gasket may be molded of a polymeric material suitable for use with drinkware, such as but not limited to polyethylene terephthalate glycol (PETG), or the gasket may be formed of a metal or metal alloy suitable for use with drinkware, such as but not limited to stainless steel.

After filling the cylindrical container with the hot or cold liquid, and installing the gasket over the open top of the cylindrical container, the cylindrical container is removably inserted into the exterior case. A portion of the sealing surface of the gasket preferably seats over a top edge of the open top of the cylindrical container. When the cylindrical container is inserted, at least the threaded spout of the gasket remains outside of the exterior case. Preferably, the closed bottom of the cylindrical container is in contact with an internal bottom end surface of the exterior case. The exterior case may be formed of a translucent thermoplastic material to allow the user to see the contents of the bottle when the cylindrical case holding a liquid is installed inside the exterior case. The exterior case defines external threads on a sidewall at or near a top end of the exterior case. The exterior case may be molded of a polymeric material, such as but not limited to polypropylene (PP) or polyethylene terephthalate glycol (PETG).

A ring-shaped shoulder fitting has internal threads that engage the external threads of the sidewall of the exterior case. The shoulder fitting has an open interior configured to receive at least a portion of the gasket, and has an inwardly directed shoulder surface configured to hold the gasket in its sealing engagement with the cylindrical container. In one embodiment of the present f, the inwardly directed shoulder surface contacts the portion of the sealing surface of the gasket that seats over the top edge of the open top of the cylindrical container. The shoulder fitting may be molded of a polymeric material, such as but not limited to polypropylene (PP) or polyethylene terephthalate glycol (PETG).

A footer is at the bottom end of the exterior case. The footer defines a first set of internal threads that engage with external threads of a footer cap. The footer cap is removably attachable to the footer. The footer cap defines a storage compartment to store one or more items therein while the footer cap is attached to the footer. Such items may be a snack food, such as nuts, or a powder, such as a drink flavoring mix, or one or more pills, such as vitamins or pharmaceuticals. In one embodiment, the footer and the footer cap are formed of a same thermoplastic material. The footer and footer cap may be molded of a polymeric material, such as but not limited to polypropylene (PP) or polyethylene terephthalate glycol (PETG).

A top cap may be provided that is removably engageable to the externally threaded spout of the gasket. Representative top caps are a sport cap, a flat cap, an industrial cap and a standard cap. In one embodiment, the top cap is configured with an opening to receive a drinking straw.

In one advantageous embodiment, a tea infuser is removably insertable into the gasket. A portion of the tea infuser, when installed in the gasket, extends into the cylindrical container when the gasket is engaged to the cylindrical container.

In another advantageous embodiment, a fruit infuser is removably insertable into the gasket. The fruit infuser has a screen portion to prevent fruits mixed with the liquid in the cylindrical container from exiting the cylindrical container through the gasket and the spout of the gasket.

In yet another advantageous embodiment, a strap holder projects from an outer surface of the shoulder fitting.

BRIEF DESCRIPTION OF THE DRAWINGS

The foregoing summary, as well as the following detailed description of the disclosure, will be better understood when read in conjunction with the appended drawings. For the purpose of illustrating the disclosure, there are shown in the drawings embodiments of insulated drinkware containers with a secondary compartment which are presently preferred. It should be understood, however, that the disclosure is not limited to the precise arrangements and instrumentalities shown. In the drawings:

FIG. 18 shows a front elevational view of a fifth modular bottle in assembled form according to the present invention; and FIG. 19 shows a front perspective view of the modular bottle of FIG. 18 with the gasket removed.

DETAILED DESCRIPTION

Figure 1:
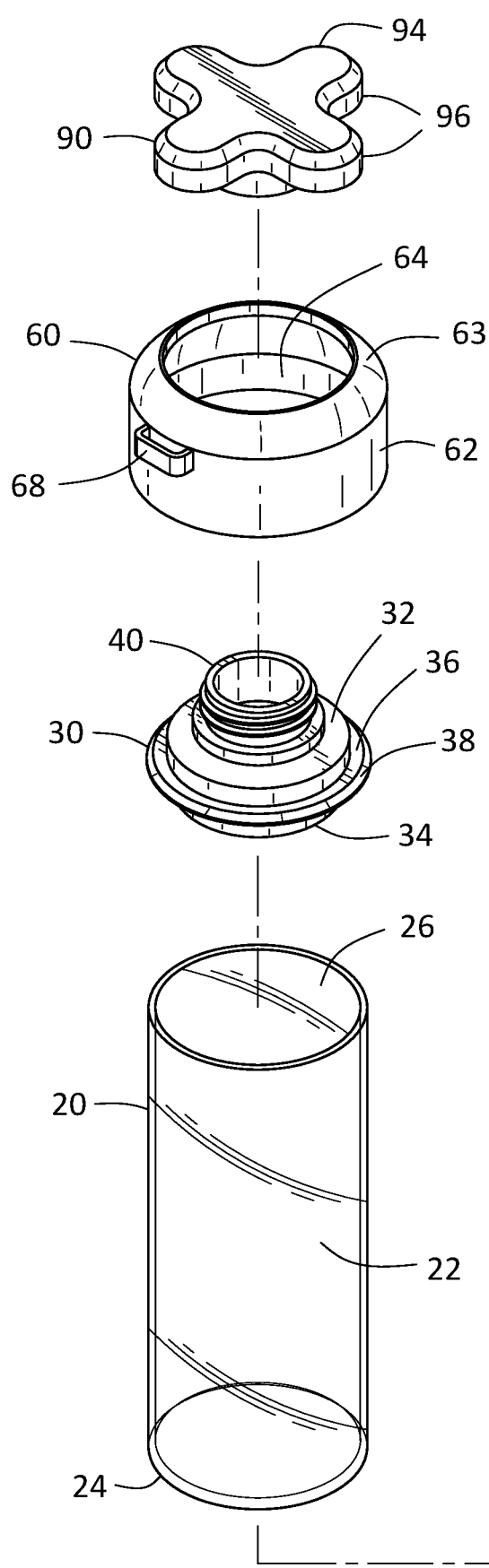
FIG. 1 is a FIG. 1 is an exploded right front perspective view of a first modular bottle according to the present invention.
Figure 1:
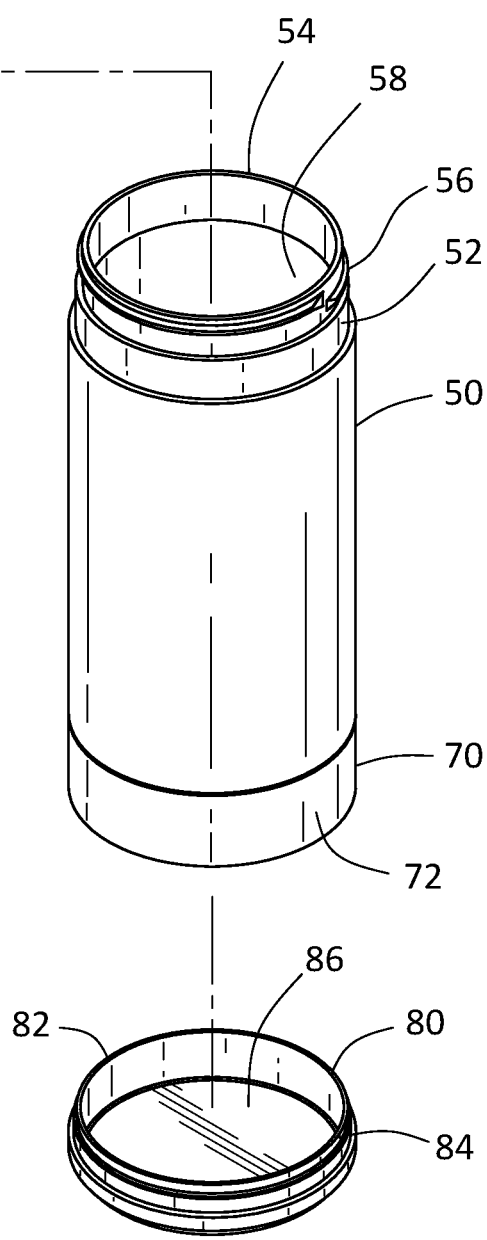
Figure 2:
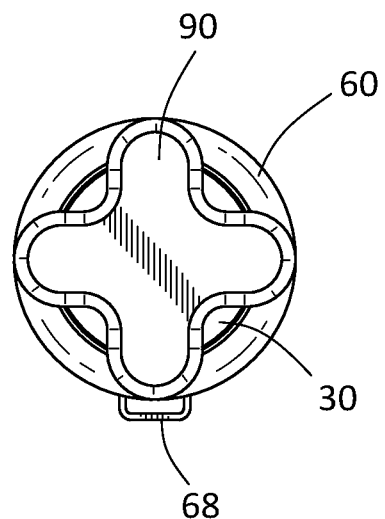
FIG. 2 is a top plan view of the modular bottle of FIG. 1.
Figure 3:
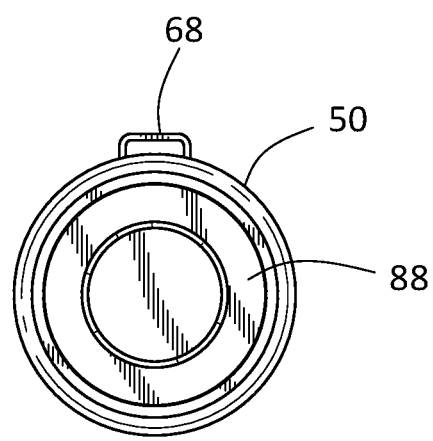
FIG. 3 is a bottom plan view of the modular bottle of FIG. 1.
Figure 4:
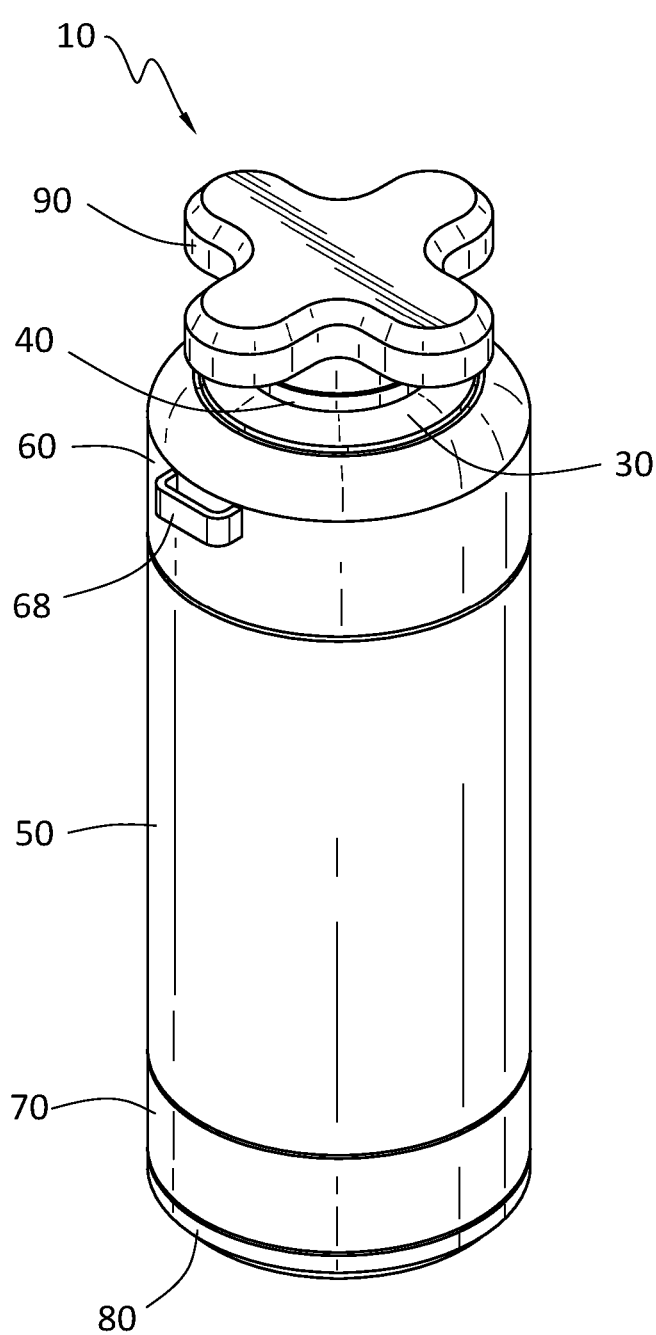
FIG. 4 is a right front perspective view of the modular bottle of FIG. 1 in assembled form.
Figure 5:
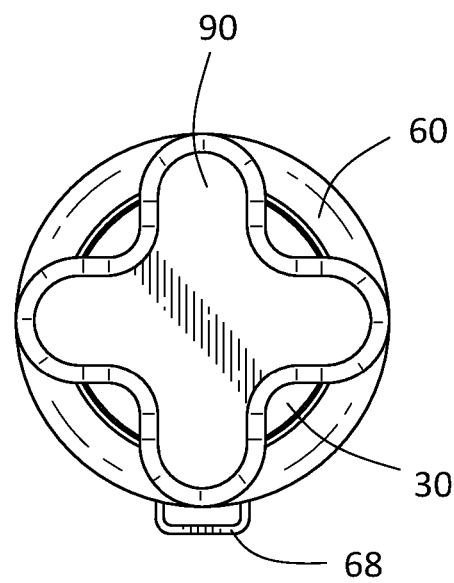
FIG. 5 is a top plan view of the assembled modular bottle of FIG. 4.
Figure 6:
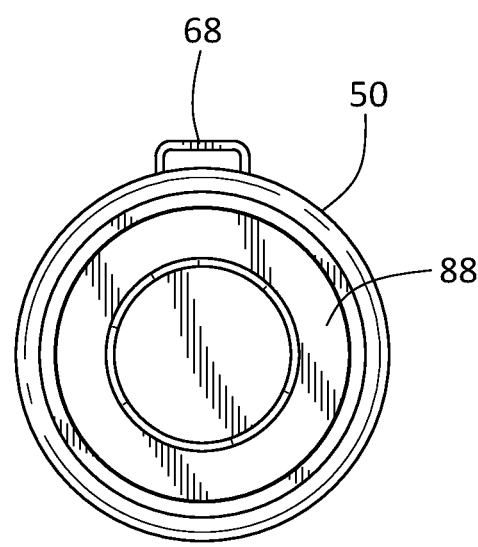
FIG. 6 is a bottom plan view of the assembled modular bottle of FIG. 4.
Figure 7:
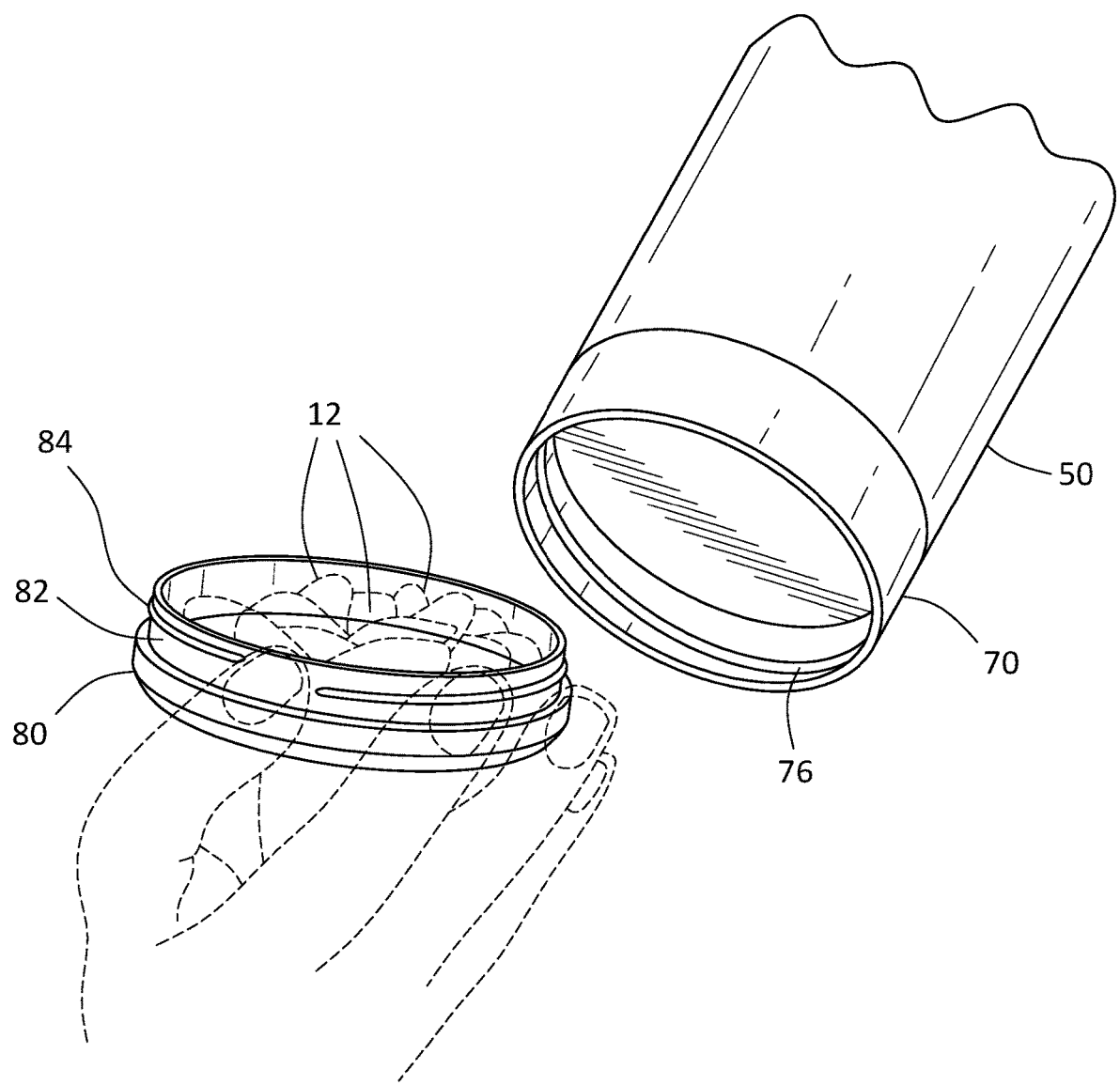
FIG. 7 is a left bottom perspective view of a footer cap removed from a footer of the modular bottle of FIG. 4, revealing a storage compartment for items.

Certain terminology is used in the following description for convenience only and is not limiting. Unless specifically set forth herein, the terms "a," "an" and "the" are not limited to one element, but instead should be read as meaning "at least one." The terminology includes the words noted above, derivatives thereof and words of similar import.

It also should be understood that the terms "about," "approximately," "generally," "substantially" and like terms, used herein when referring to a dimension or characteristic of a component of the invention, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

The present invention will be described in detail by way of examples with reference to the attached drawings. Throughout this description, the preferred embodiments and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s). The following description is provided to enable any person skilled in the art to make and use the invention and sets forth the best modes contemplated by the inventors of carrying out their invention. Various modifications, however, will remain readily apparent to those skilled in the art without departing from the spirit and scope of the invention, which is defined by the accompanying claims.

It should be noted that steps recited in any method claims below do not necessarily need to be performed in the order in which they are recited. Those of ordinary skill in the art will recognize variations in performing the steps from the order in which they are recited. In addition, the lack of mention or discussion of a feature, step or component provides the basis for claims where the absent feature or component is excluded by way of a proviso or similar claim language.

Referring first to FIGS. 1-7, a bottle 10 for liquids includes a cylindrical container 20 to hold the desired liquid, which may be a hot or cold beverage, including but not limited to water, sports drinks, sodas, teas, coffees and energy drinks. The container 20 has a sidewall 22, a bottom end 24 and an open top end 26. The cylindrical container may be formed of glass or borosilicate glass or reinforced borosilicate glass, or other suitable material. Glass material is preferred over plastics because glass does not leach into the liquids held in the container. Once the container 20 is filled with the desired liquid, a gasket 30 is placed over the open top end 26.

The gasket 30 has an upper portion or top surface 32, a sealing surface 34 opposite the upper portion 32. The gasket has a lower portion 36 from which a gasket shoulder 38 extends. The gasket 30 defines an open center portion or internal conduit 44 configured to dispense the liquid. A spout 40 of the gasket 30 extends upwardly from the top surface 32, which spout 40 defines external threads 42 that are configured to engage with threads of a cap 90. The sealing surface of the gasket 30 may comprise a ring that is separable from the gasket 30. At least the sealing surface 34 of the gasket 30 is formed from high quality food grade silicone. Other portions of the gasket may be formed of tritan-BPA-free, or other bisphenol-free materials. Alternatively, the gasket 30 may be formed of PETG and/or PP.

The cylindrical container 20 holding the desired liquid, and with the top end 26 covered by the gasket 30 is removably insertable into an exterior case 50. In the embodiment shown in FIGS. 1-7, the exterior case 50 has a cylindrical configuration with a sidewall 52, a closed bottom end, and an open top end 54, and defines a volume of sufficient size to receive the container 20. Screw threads 56 are provided at a top portion of the sidewall 52 that are configured to engage with the threads of a shoulder fitting 60. The exterior case may be formed of PETG and/or PP, or recycled PP or other suitable thermoplastic materials.

The shoulder fitting 60 defines an external wall 62 forming a cylinder, with a chamfered or curved upper shoulder 63. Screw threads 66 are provided on a portion of the internal surface 64 of the shoulder fitting 60. The screw threads 66 are configured to engage with the screw threads 56 provided at the top portion of the sidewall 52 of the exterior case. A strap holder 68 may project from the external wall 62 of the shoulder fitting 60. Alternatively, a strap holder may project from the sidewall 52 of the exterior case 50. The shoulder fitting may be formed of tritan-BPA-free, or other bisphenol-free materials.

A footer 70 is installed on the bottom end of the exterior case 50. The footer 70 has an outer wall 72, and inner wall 74 and internal threads 76 on the inner wall 74. The footer may be formed of PETG and/or PP, or recycled PP or other suitable thermoplastic materials.

A footer cap 80 has an upstanding sidewall 82 with external threads 84 configured to engage with the internal threads 76 of the footer 70. The upstanding sidewall 82 surrounds a surface such that the footer cap 80 defines a compartment space 86 configured to hold items 12, which may be snacks, pills, or powders. See FIG. 7. The upstanding sidewall 82 of the footer cap 80 is screwed into the footer 70 so that the items 12 may be stored and carried with the bottle 10. When the footer cap 80 is engaged, the bottom surface 88 of the footer cap 80 comprises the bottom supporting surface of the bottle 10. The footer cap may be formed of PETG and/or PP, or recycled PP or other suitable thermoplastic materials.

A resealable cap 90 has internal threads 92 configured to engage with the threads 42 of the spout 40 of the gasket 30. In the embodiment of FIGS. 1-7, the cap 90 is an industrial cap with grip portions 94 forming curvilinear cross arms 96. The resealable cap may be formed of tritan-BPA-free, or other bisphenol-free materials. Alternatively, the resealable cap 90 may be molded of a polymeric material, such as but not limited to polypropylene (PP) or polyethylene terephthalate glycol (PETG).

Figure 8:
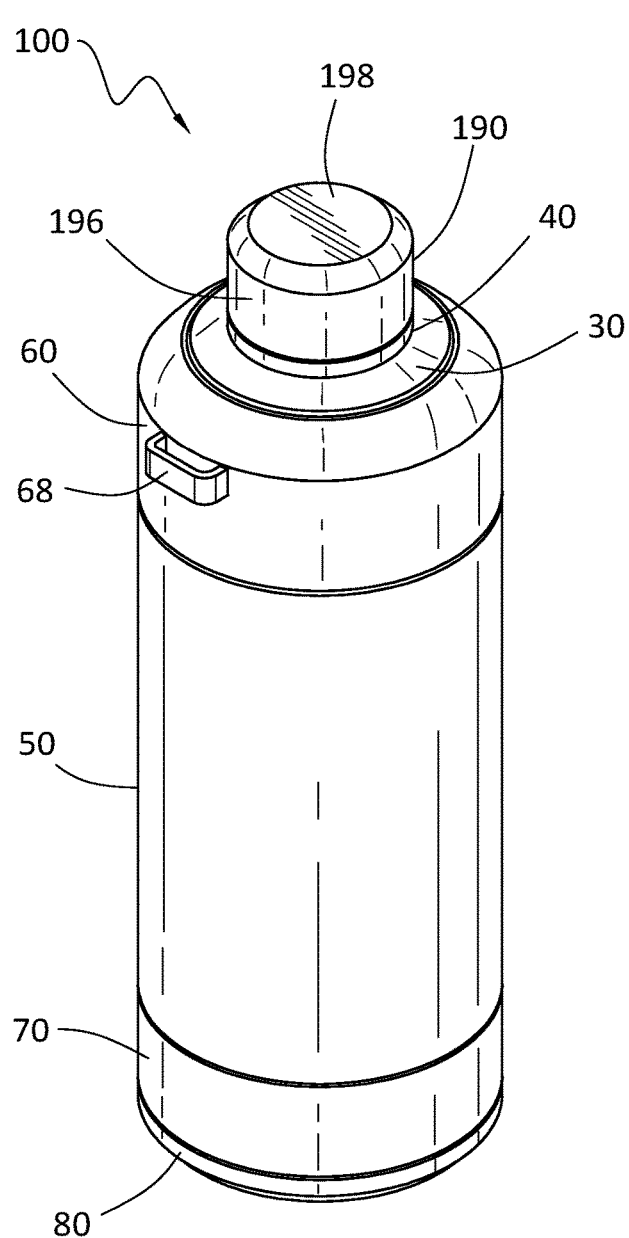
FIG. 8 is a right front perspective view of a second modular bottle in assembled form according to the present invention.
Figure 9:
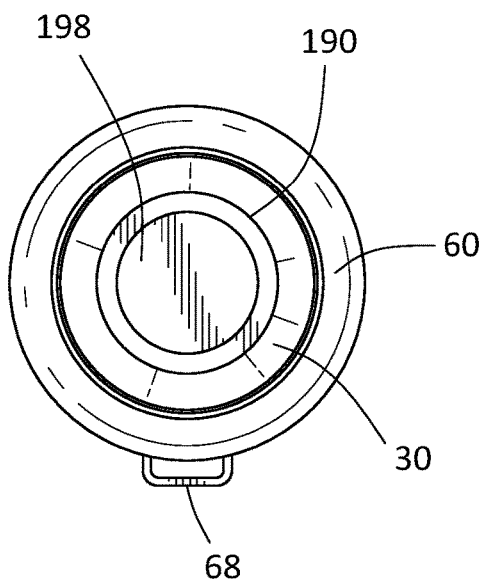
FIG. 9 is a top plan view of the modular bottle of FIG. 8.
Figure 10:
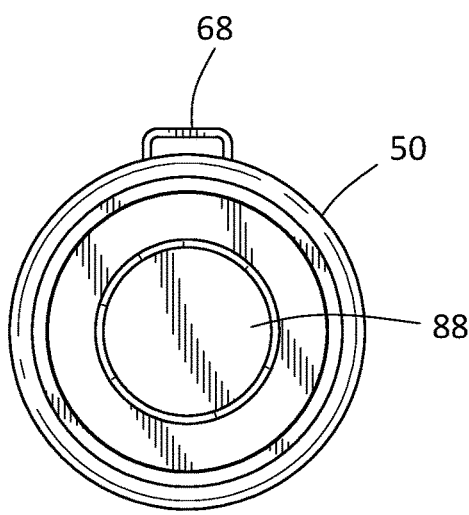
FIG. 10 is a bottom plan view of the modular bottle of FIG. 8.
Figure 11:
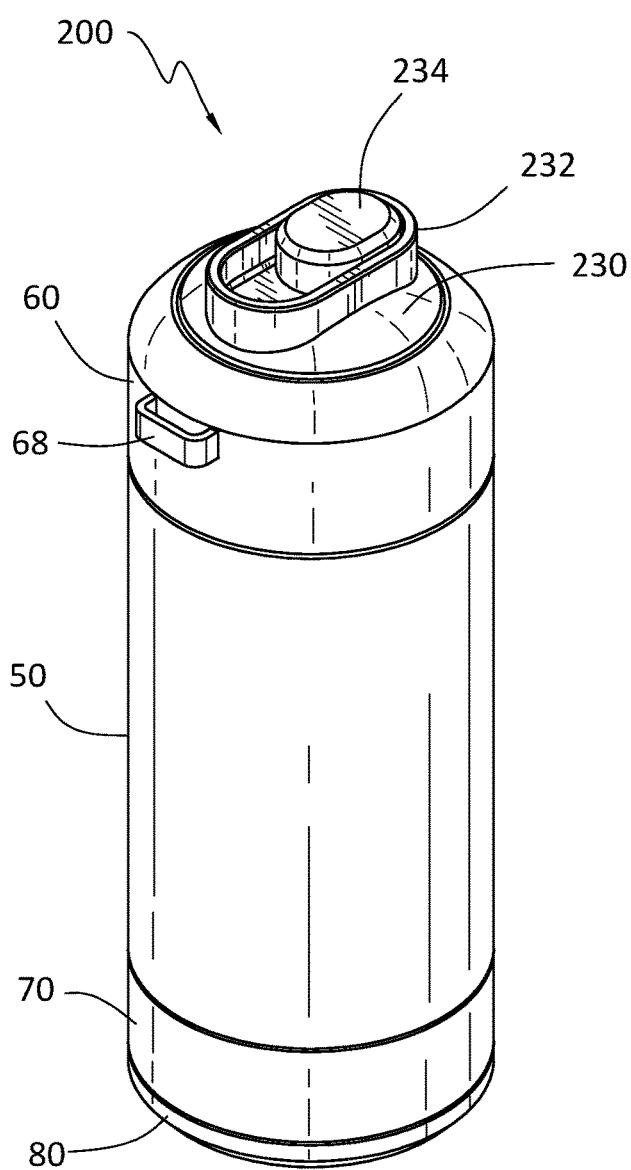
FIG. 11 is a right front perspective view of a third modular bottle in assembled form according to the present invention.
Figure 12:
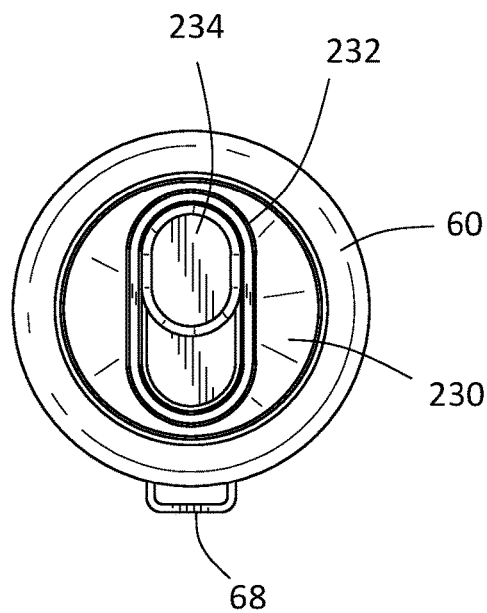
FIG. 12 is a top plan view of the modular bottle of FIG. 11
Figure 13:
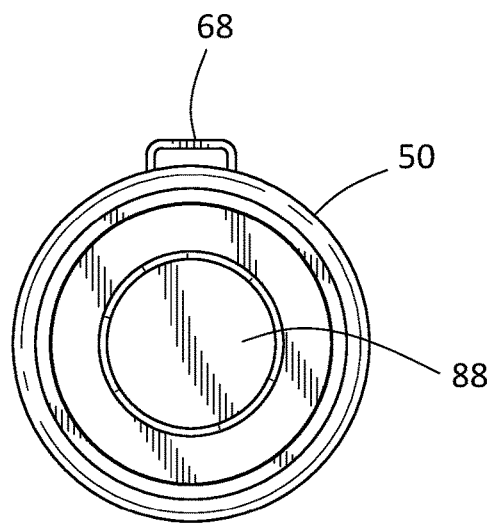
FIG. 13 is a bottom plan view of the modular bottle of FIG. 11.

Referring next to FIGS. 8-10, an alternative embodiment of the present invention comprises a bottle 100 with a different cap structure. Like elements have the same reference numbers throughout the Figures. In FIGS. 8-10, the resealable cap 190 has a cylindrical sidewall 196 with a top surface 198 that is chamfered. Internal screw threads on the cylindrical sidewall 198 (not shown in FIGS. 8-10), engage with the external threads 42 of the spout 40 of the gasket 30.

Figure 14:
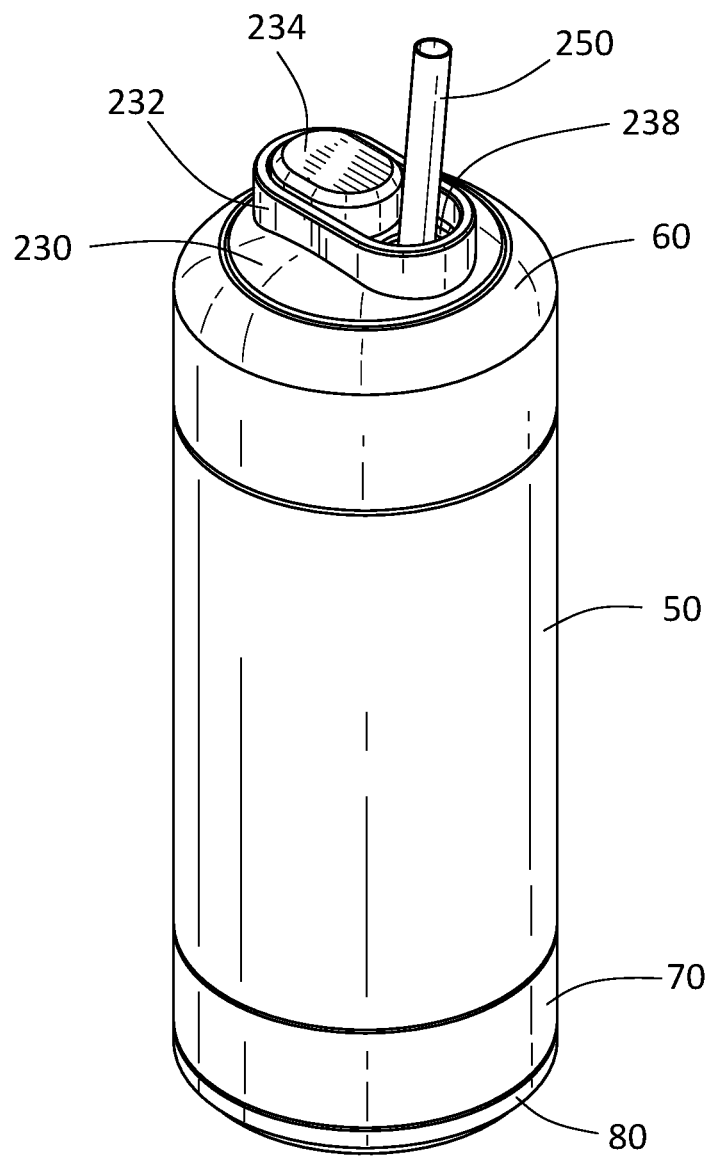
FIG. 14 is a left rear perspective view of the modular bottle of FIG. 11 with a drinking straw inserted into the spout opening thereof.

Still another embodiment of a bottle 200 according to the present invention is shown in FIGS. 11-14. In this embodiment a gasket 230 has a top surface from which an upstanding wall 232 projects. The upstanding wall 232 has a continuous oval configuration comparable to a spout. The gasket 230 defines a conduit opening 238 that is covered by a sliding button cover 234 which is indexed from a closed position covering the conduit opening 238 to an open position exposing the conduit opening 238. The upstanding wall 232 surrounds sliding button cover 234 and the conduit opening 238 in a manner that permits the desired sliding motion of the sliding button cover 234. A user may pour liquid from the cylindrical container out of the bottle 200 through the conduit opening 238, or may insert a straw 250 into the conduit opening 238 as shown in FIG. 14.

Figure 15:
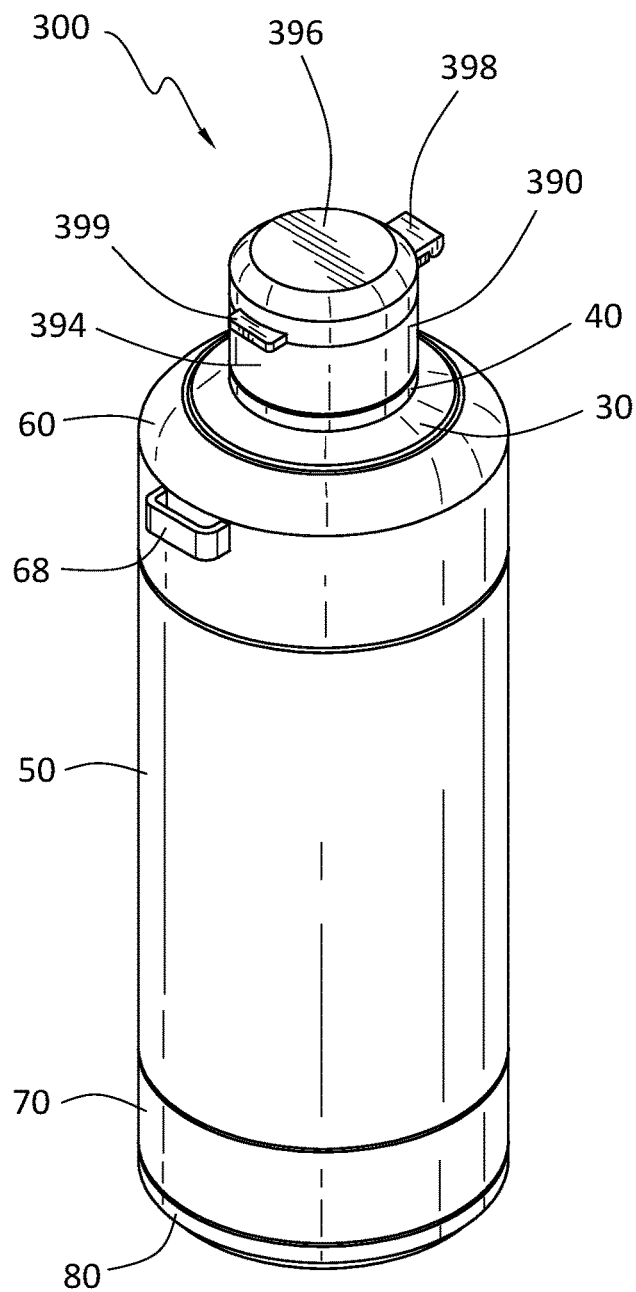
FIG. 15 is a right front perspective view of a fourth modular bottle in assembled form according to the present invention.
Figure 16:
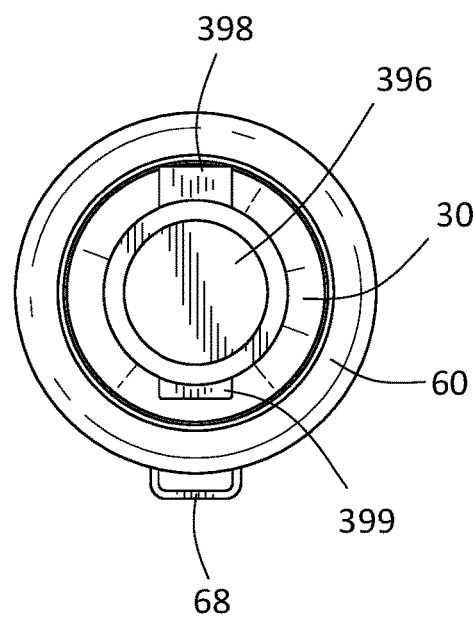
FIG. 16 is a top plan view of the modular bottle of FIG. 15.
Figure 17:
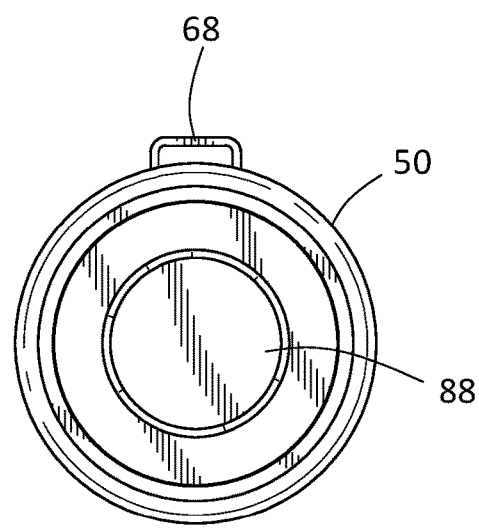
FIG. 17 is a bottom plan view of the modular bottle of FIG. 15.

FIGS. 15-17 show yet another embodiment of a bottle 300 according to the present invention. In this embodiment, a flip top cap 390 is threadingly engaged to the spout 40 of the gasket 30. The flip top cap 390 has a cylindrical sidewall 394 to which a flip top 396 is attached by bending hinge 398. A flip top grip 399 extends from the flip top 396, by which the user may urge the flip top 396 away from the cylindrical sidewall 394 to open the cap 390 and dispense liquid through the spout 40 of the gasket 30.

FIGS. 18 and 19 show still another embodiment of a bottle 400 with a gasket 430 inside which is seated a strainer 450. A sliding cap 434 is provided over the conduit opening of the gasket 430 and a surrounding wall 432 projects from a top surface of the gasket and extends around the conduit opening and the sliding cap 434. In FIG. 18, the strainer 450 projects into the cylindrical container 20 when the gasket 430 is installed over the open end of the cylindrical container 20. The strainer 450 in this configuration may be filled with loose tea leaves, powdered drink mix or other particulate materials to be entrained or mixed with the liquid in the cylindrical container 20 of the bottle 400. Alternatively, as shown in FIG. 19, fruits or other items 412 are mixed with the liquid in the cylindrical container 20, and are prevented from exiting the bottle 400 through the conduit opening 438 of the gasket 430 by the strainer 450. Liquid from the cylindrical container 20 passes through the strainer 450 openings, while the items 412 inside the cylindrical container 20 remain therein for later disposal. The embodiment of the present invention shown in FIG. 19 also includes the footer 70 closed by a footer cap 80 that defines a compartment for holding items.

The bottles according to the invention are unique due to the combination of components and how they fit together. The glass container with gaskets are held together by an exterior body that preferably is translucent, and insulates and protects the glass container. The shoulder fitting securely locks the inner container and gasket within the exterior case, preventing liquid held in the container. The shoulder fitting is removable to permit a user to access and/or remove the container from the exterior case for cleaning, filling or inserting accessories, such as tea infusers or strainers. The footer cap creates a compartment for storing desired items in a secure way, and separate from the container for liquids.

Additional objectives, advantages, features and application possibilities of the present invention ensue from the description of embodiments making reference to the drawings. In this context, all of the described and/or depicted features, either on their own or in any meaningful combination, constitute the subject matter of the present invention, also irrespective of their compilation in the claims or the claims to which they refer back.

The invention claimed is:

1. A bottle for liquids, comprising:
 a cylindrical container configured for receiving a liquid, said cylindrical container having a sidewall, a closed bottom and an open top opposite the closed bottom;
 a gasket with a lower portion having a sealing surface that is removably insertable into the open top of the cylindrical container, and with an upper portion opposite the lower portion, said gasket defining a conduit adapted to receive liquid to be dispensed from the bottle, and having an externally threaded spout in fluid communication with the open volume and projecting from the upper portion;
 an exterior case into which the cylindrical container is removably inserted, wherein when said cylindrical container is inserted, at least the threaded spout remains outside of the exterior case, said exterior case defining external threads on a sidewall at or near a top end of the exterior case;
 a ring-shaped shoulder fitting with internal threads that engage the external threads of the sidewall of the exterior case, said shoulder fitting having an open interior configured to receive at least a portion of the gasket, and having an inwardly directed shoulder surface configured to hold the gasket in its sealing engagement with the cylindrical container;
 a footer at a bottom end of the exterior case, said footer defining a first set of internal threads; and
 a footer cap removably attachable to the footer, said footer cap having external threads configured to engage with the internal threads of the footer, said footer cap defining a storage compartment to store one or more items therein while said footer cap is attached to the footer.

2. The bottle of claim 1, further comprising a top cap removably engageable to the externally threaded spout.

3. The bottle of claim 1, wherein a portion of the sealing surface of the gasket seats over a top edge of the open top of the cylindrical container.

4. The bottle of claim 1, wherein the sealing surface of the gasket comprises a separate ring.

5. The bottle of claim 3, wherein the inwardly directed shoulder surface contacts the portion of the sealing surface of the gasket that seats over the top edge of the open top of the cylindrical container.

6. The bottle of claim 1, wherein the closed bottom of the cylindrical container is in contact with an internal bottom end surface of the exterior case.

7. The bottle of claim 1, wherein the cylindrical container is formed of glass or borosilicate glass or reinforced borosilicate glass.

8. The bottle of claim 1, wherein the exterior case is formed of a translucent thermoplastic material.

9. The bottle of claim 1, further comprising a tea infuser removably insertable into the gasket, with a portion extending into the cylindrical container when the gasket is engaged to the cylindrical container.

10. The bottle of claim 1, further comprising a fruit infuser removably insertable into the gasket.

11. The bottle of claim 2, wherein the top cap is configured with an opening to receive a drinking straw.

12. The bottle of claim 1, wherein a strap holder projects from an outer surface of the shoulder fitting.

13. The bottle of claim 1, wherein the footer and the footer cap are formed of a same thermoplastic material.

* * * * *